US010452679B2

(12) United States Patent
Otaguro

(10) Patent No.: US 10,452,679 B2
(45) Date of Patent: Oct. 22, 2019

(54) SYSTEMS AND METHODS FOR CONTEXT-SENSITIVE DATA ANNOTATION AND ANNOTATION VISUALIZATION

(71) Applicant: Google Inc., Mountain View, CA (US)

(72) Inventor: David Otaguro, Lake Forest, CA (US)

(73) Assignee: Google LLC, Mountain View, CA (US)

( * ) Notice: Subject to any disclaimer, the term of this patent is extended or adjusted under 35 U.S.C. 154(b) by 314 days.

(21) Appl. No.: 15/282,680

(22) Filed: Sep. 30, 2016

(65) Prior Publication Data

US 2018/0096039 A1 Apr. 5, 2018

(51) Int. Cl.
*G06F 16/22* (2019.01)
*G06F 16/23* (2019.01)
*G06F 16/25* (2019.01)
*G06F 16/26* (2019.01)
*G06F 16/9038* (2019.01)

(52) U.S. Cl.
CPC .......... *G06F 16/26* (2019.01); *G06F 16/221* (2019.01); *G06F 16/23* (2019.01); *G06F 16/252* (2019.01); *G06F 16/9038* (2019.01)

(58) Field of Classification Search
CPC .......... G06F 17/30572; G06F 17/3056; G06F 17/30991; G06F 17/30315; G06F 17/30345; G06F 16/26; G06F 16/9038; G06F 16/252; G06F 16/221; G06F 16/23
See application file for complete search history.

(56) References Cited

U.S. PATENT DOCUMENTS

| | | | |
|---|---|---|---|
| 6,338,056 B1 * | 1/2002 | Dessloch | G06F 17/30911 707/711 |
| 7,356,563 B1 * | 4/2008 | Leichtling | G06Q 10/06 345/2.1 |
| 9,026,900 B1 | 5/2015 | Pugh | |
| 9,094,360 B1 * | 7/2015 | Bapat | H04L 63/102 |
| 2002/0049738 A1 * | 4/2002 | Epstein | G06F 17/30864 |
| 2004/0260717 A1 * | 12/2004 | Albornoz | G06F 17/30873 |

(Continued)

OTHER PUBLICATIONS

Notification of Transmittal of the International Search Report and the Written Opinion of the ISR on PCT/US2017/053508 dated Nov. 14, 2017.

(Continued)

*Primary Examiner* — Jorge A Casanova
(74) *Attorney, Agent, or Firm* — Foley & Lardner LLP

(57) ABSTRACT

Systems and methods for receiving, storing, and returning annotations in association with annotated data. Data visualizations can be generated using data selected from a data organization and storage system, e.g., a database. Annotation data is stored in association with the underlying data used to generate data visualizations. Future renderings of data visualizations using the same underlying data may then include the corresponding annotation data. In some implementations, a system includes a data storage system storing a plurality of data entries in a database and a processor configured to generate data visualizations representative of the plurality of data entries stored in the database, receive a selection of an element of a data visualization, identify data entries represented by the selected element; receive annotation data associated with the selection, and record data associating the received annotation data with the identified data entries.

20 Claims, 6 Drawing Sheets

(56) References Cited

U.S. PATENT DOCUMENTS

| | | | |
|---|---|---|---|
| 2005/0209989 A1* | 9/2005 | Albornoz | G06F 17/2235 |
| 2009/0144313 A1* | 6/2009 | Hodge | G06F 17/30592 |
| 2013/0124965 A1 | 5/2013 | Elias et al. | |
| 2013/0159307 A1* | 6/2013 | Wolge | G06F 17/30572 |
| | | | 707/737 |
| 2014/0358846 A1 | 12/2014 | Hartlaub et al. | |
| 2015/0310070 A1* | 10/2015 | Stefik | G06F 17/30525 |
| | | | 707/740 |
| 2018/0005149 A1* | 1/2018 | Dhingra | G06Q 10/0633 |
| 2018/0210936 A1* | 7/2018 | Reynolds | G06F 17/30303 |

OTHER PUBLICATIONS

"Written Opinion of the International Preliminary Examining Authority", Google LLC., PCT/US2017/053508, dated Sep. 4, 2018, 20 pages.

Micheline Elias et al: "Annotating BI visualization dashboards : needs & challenges", Proceeding of the 2012 ACM Annual Conference on Human Factors in Computing Systems, CHI '12, Jan. 1, 2012 (Jan. 1, 2012), p. 1641, XP055501526 New York, New York DOI: 10.1145/2207676.22082883 ISBN: 978-1-4503-1015-4.

* cited by examiner

SYSTEMS AND METHODS FOR CONTEXT-SENSITIVE DATA ANNOTATION AND ANNOTATION VISUALIZATION

BACKGROUND

Data visualizations gather data into visual or graphical formats that have the potential to facilitate consumption and understanding of the gathered data. Common examples of data visualizations are bar charts, line charts, pie charts, plot diagram, box plot diagrams, and the like. Data visualizations are used in many contexts, including, for example, reporting utilities, monitoring tools, data summaries, and analytics. Some forms of data visualization are well tailored to particular tasks. For example, a plot diagram represents data as a set of dots plotted on a chart. If the bulk of the dots are clustered together, it becomes easy to spot the outliers. As another example, a line chart represents relationships between data as lines, which can make trends such as upward or downward trajectories clear at a glance.

SUMMARY

In some aspects, the disclosure relates to a system for annotating data. The system includes a data storage system storing a plurality of data entries in a database, a processor configured to execute instructions stored in a memory, and the memory storing the instructions. The instructions stored in the memory, when executed by the processor, cause the processor to: generate a first data visualization representative of the plurality of data entries stored in the database; receive a selection of an element of the first data visualization; identify a subset of the plurality of data entries represented by the selected element of the data visualization; receive annotation data associated with the selection; record, in the database, an associative record associating the received annotation data with the identified subset of the plurality of data entries represented by the selected element of the data visualization; generate a second data visualization representative of data that includes a data entry from the identified subset and include, with the second data visualization, the received annotation data in association with a portion of the second data visualization representative of the included data entry from the identified subset.

In some aspects, the disclosure relates to a method that includes generating a first data visualization representative of a plurality of data entries stored in a database; receiving a selection of an element of the first data visualization; identifying a subset of the plurality of data entries represented by the selected element of the data visualization; receiving annotation data associated with the selection; recording, in the database, an associative record associating the received annotation data with the identified subset of the plurality of data entries represented by the selected element of the data visualization; generating a second data visualization representative of data that includes a data entry from the identified subset; and including, with the second data visualization, the received annotation data in association with a portion of the second data visualization representative of the included data entry from the identified subset.

In some aspects, the disclosure relates to a computer-readable memory storing executable instructions that, when executed by a computing processor, cause the computing processor to generate a first data visualization representative of the plurality of data entries stored in a database; receive a selection of an element of the first data visualization; identify a subset of the plurality of data entries represented by the selected element of the data visualization; receive annotation data associated with the selection; record, in the database, an associative record associating the received annotation data with the identified subset of the plurality of data entries represented by the selected element of the data visualization; generate a second data visualization representative of data that includes a data entry from the identified subset and include, with the second data visualization, the received annotation data in association with a portion of the second data visualization representative of the included data entry from the identified subset.

BRIEF DESCRIPTION OF THE DRAWINGS

The above and related objects, features, and advantages of the present disclosure will be more fully understood by reference to the following detailed description, when taken in conjunction with the accompanying figures, wherein.

For purposes of clarity, not every component may be labeled in every figure. The drawings are not intended to be drawn to scale. Like reference numbers and designations in the various figures indicate like elements.

DETAILED DESCRIPTION

Data visualizations can be dynamically generated using fresh data selected from a database, e.g., a relational database stored using a Relational Database Management System (RDBMS) or any other type of data organization and storage system. A pie chart, line chart, bar chart, box plot diagram, etc., can be used to visualize composite data drawn from one or more tables and aggregated according to the particulars of the visualization. As new data is entered into the database, it is reflected in new renderings of the data visualization. A tool, e.g., a traffic monitoring tool or a bug-status tracking tool, can be used to provide visualizations to users of the tool. Sometimes, a user of the tool might want to annotate a particular aspect of the visualized data. For example, a disproportionate spike on a bar chart might correspond to a particular event. The user can select the spike on the chart and annotate it with an explanation of the event. The annotation is stored in association with the underlying data used to generate the chart. Future renderings of the chart then include the annotation. Further, because the annotation is associated with the underlying data (and not just the visualization), other charts that use the same data can also include the annotation.

In some implementations, annotations are stored in a database table. Each annotation can include identifiers corresponding to the data to be annotated. In some implementations, each annotation is associated with a data scope. In some such implementations, the annotation data scope is a collection of filters and a set of column definitions that circumscribe the set of data cells to be annotated. In some implementations, the data scope is a Structured Query Language (SQL) query. SQL is particularly flexible and can dynamically capture new rows that satisfy the query. In some implementations, the data scope uses a more structured definition to avoid inadvertently including additional data not meant to be included in the annotated dataset. In some implementations, each annotation includes permissions data such as an Access Control List (ACL). These implementations, and others, are described in the context of a data visualization platform used to serve visualization data to client devices for presentation.

Figure 1:
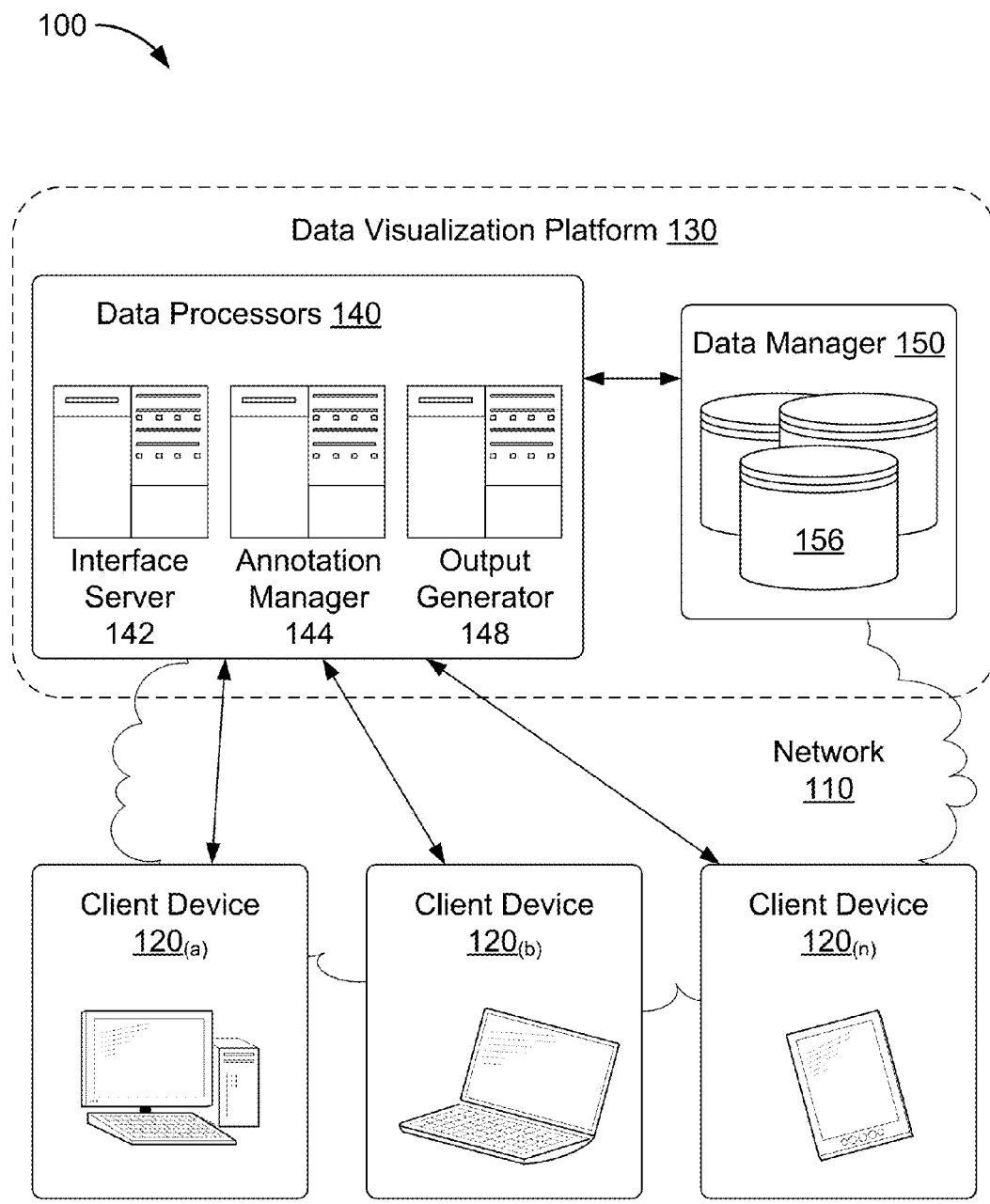
FIG. 1 is a diagram of an example data visualization platform in a network environment.

FIG. 1 is a diagram of an example data visualization platform 130 in a network environment 100. The network environment 100 includes a network 110, various client devices $120_a$-$120_n$ (generally referred to as a client device 120) and the data visualization platform 130. The data visualization platform 130 includes data processors 140 such as an interface server 142, an annotation manager 144, and an output generator 148. The data visualization platform 130 includes a data manager 150, which provides data storage and management services persisting data in memory 156. In some implementations, the data visualization platform 130 is unified in a single computing system. In some implementations, the data visualization platform 130 is constructed from multiple computing devices working in concert, e.g., communicating via a dedicated backbone network and/or using the network 110. In some implementations, the data visualization platform 130 includes computing devices provided by third-parties, e.g., using a multi-tenancy architecture or cloud computing hosts.

As shown in FIG. 1, a network 110 enables communication between various client devices 120 and data processors 140 for a data visualization platform 130. The network 110 conveys information between the client devices 120 and the data processors 140. In some implementations, data flows through the network 110 from a source node to a destination node as a flow of data packets, e.g., in the form of data packets in accordance with the Open Systems Interconnection (OSI) layers. A flow of packets may use, for example, an OSI layer-4 transport protocol such as the User Datagram Protocol (UDP), the Transmission Control Protocol (TCP), or the Stream Control Transmission Protocol (SCTP), transmitted via the network 110 layered over an OSI layer-3 network protocol such as Internet Protocol (IP), e.g., IPv4 or IPv6. The network 110 is composed of various network devices linked together to form one or more communication paths between participating devices. Each networked device includes at least one network interface for receiving and/or transmitting data, typically as one or more data packets. An illustrative network 110 is the Internet; however, other networks may be used. The network 110 may be composed of multiple connected sub-networks. The network 110 can be a local-area network (LAN) such as a company intranet, a metropolitan area network (MAN), a wide area network (WAN), an inter network such as the Internet, or a peer-to-peer network, e.g., an ad hoc WiFi peer-to-peer network. The data links between devices in the network 110 may be any combination of wired links (e.g., fiber optic, mesh, coaxial, twisted-pair such as Cat-5 or Cat-6, etc.) and/or wireless links (e.g., radio, satellite, microwave, etc.). The network 110 may include carrier networks for mobile communication devices, e.g., networks implementing wireless communication protocols such as the Global System for Mobile Communications (GSM), Code Division Multiple Access (CDMA), Time Division Synchronous Code Division Multiple Access (TD-SCDMA), Long-Term Evolution (LTE), or any other such protocol including, but not limited to, so-called generation "3G," "4G," and "5G" protocols. The network may include short-range wireless links, e.g., via Wi-Fi, BLUETOOTH, or ZIGBEE, sometimes referred to as a personal area network (PAN) or mesh network. The network 110 may be public, private, or a combination of public and private networks. The network 110 may be any type and/or form of data network and/or communication network.

Figure 6:
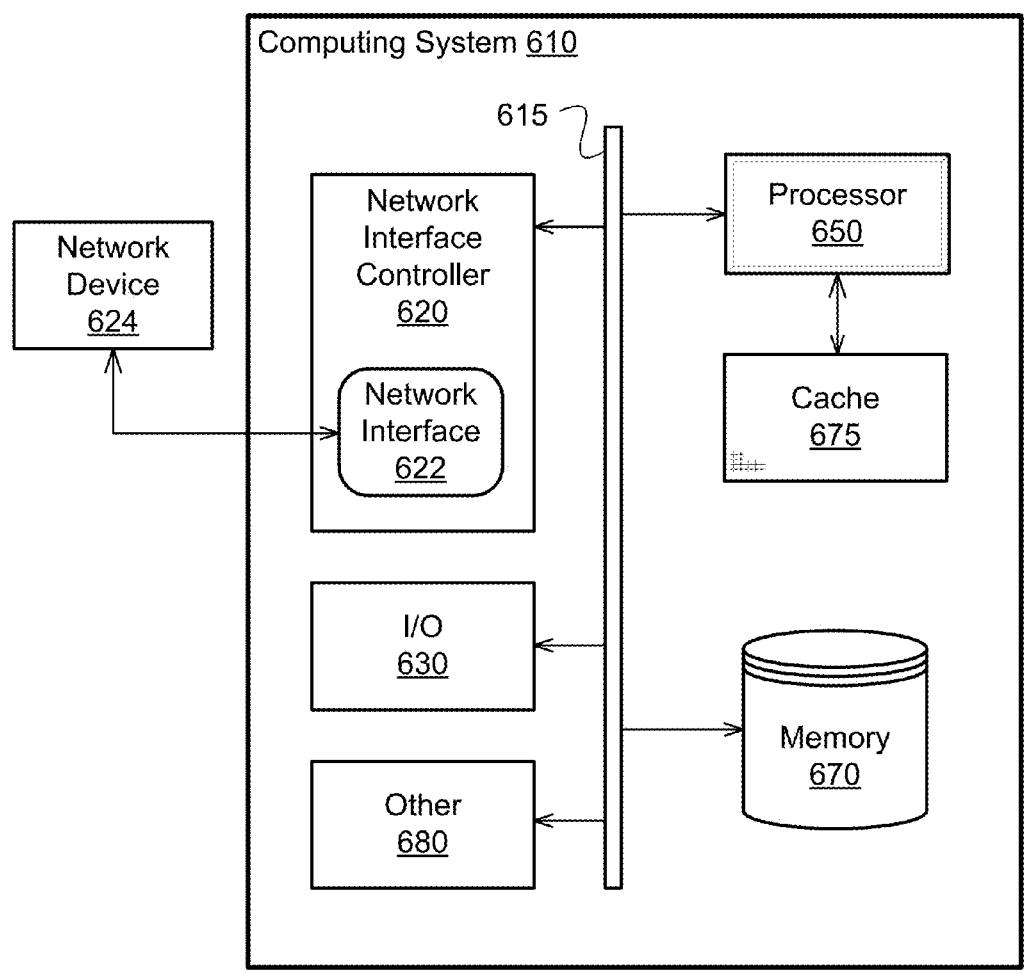
FIG. 6 is a block diagram of a computing system suitable for use in the various implementations described.

Each client device $120_a$-$120_n$ (generically a client device 120) is a computing system, or processor-based device, that facilitates interaction with the data visualization platform 130. A client device 120 is capable of exchanging information with the data visualization platform 130 via the network 110. A client device 120 may be any kind of computing device, including, for example, a desktop computer, a laptop or notepad computer, a mobile device such as a tablet or electronic pad, a personal digital assistant, or a smart phone, a video gaming device, a television or television auxiliary box (also known as a "set-top box"), a kiosk, a hosted virtual desktop, or any other such device capable of exchanging information with the data visualization platform 130 via the network 110. Generally, client devices 120 exchange information with the data visualization platform 130 to request, generate, obtain, update, or augment data visualizations. Accordingly, in some implementations, a client device 120 includes one or more hardware elements for facilitating data input and data presentation, e.g., a keyboard, a display, a touch screen, a microphone, and/or a speaker. In some implementations, a client device 120 runs an operating system managing execution of software applications on the client device 120, including one or more software applications capable of facilitating interaction with the data visualization platform 130. In some implementations, the operating system is provided with the client device 120. In some implementations, the client device 120 executes a browser application (e.g., a web browser) capable of receiving data formatted according to the suite of hypertext application protocols such as the Hypertext Transfer Protocol (HTTP) and HTTP encrypted by Transport Layer Security (HTTPS). In some such implementations, the browser facilitates interaction with the data visualization platform 130 in the form of one or more web pages. In some implementations, the browser application is provided with the client device 120. In some implementations, the client device 120 executes a custom application specific to facilitating interaction with the data visualization platform 130. In some implementations, the client device 120 includes a tool for obtaining and/or installing the custom application on the client device 120. In some implementations, the interface server 142 supports a custom instruction set, i.e., an application programming interface (API), and the custom application implements the API. In some implementations, the client device 120 is implemented using special purpose logic circuitry, e.g., an application specific integrated circuit (ASIC). In some implementations, the client device 120 is implemented using a general purpose processor. FIG. 6, described in more detail below, illustrates a computing device that, in some configurations, is suitable for use as a client device 120.

Still referring to FIG. 1, the illustrated data visualization platform 130 includes data processors 140 such as an interface server 142, an annotation manager 144, and an output generator 148. The illustrated data visualization platform 130 also includes a data manager 150. In some implementations, the data processors 140 and data manager 150 are implemented using special purpose logic circuitry, e.g., an application specific integrated circuit (ASIC). In some implementations, the data processors 140 and data manager 150 are implemented using a general purpose processor. FIG. 6, described in more detail below, illustrates a computing device that, in some configurations, is suitable for use as a data processor 140 and/or as a data manager 150. Although illustrated and described herein as discrete computing systems, the interface server 142, annotation manager 144, output generator 148, and data manager 150 may be implemented on shared hardware. In some implementations, one or more of the interface server 142, annotation manager 144, output generator 148, and data manager 150 are implemented using the same computing device. In some implementations, one or more of the interface server 142, annotation manager 144, output generator 148, and data manager 150 are implemented in a distributed fashion across multiple computing devices. For example, functionality described herein as handled by the data manager 150 may be distributed across multiple computing systems each with access to computer readable memory 156.

Figure 3:
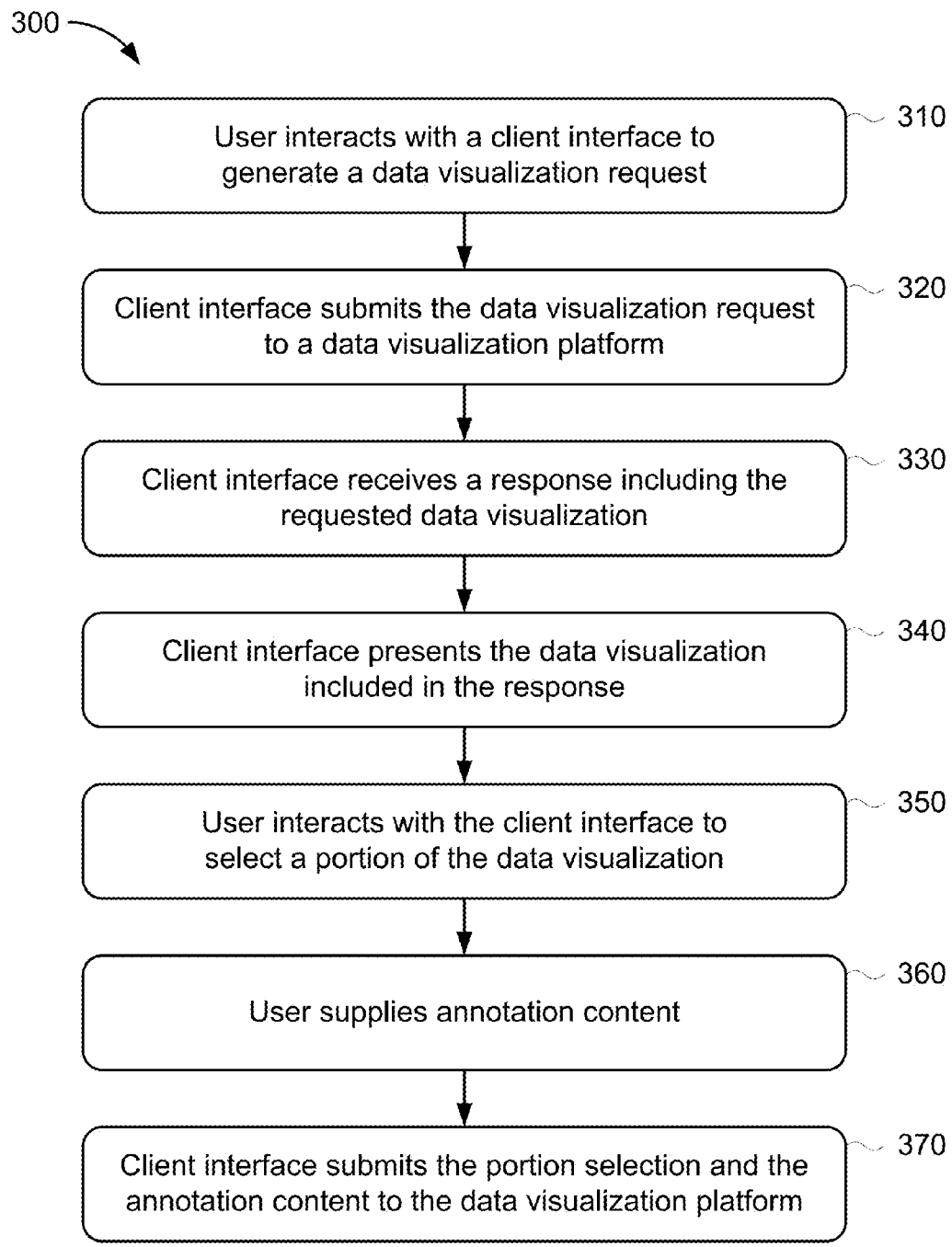
FIG. 3 is a flowchart for a user experience interacting with an interface.

The interface server 142 provides an interface between the client devices 120 and the data visualization platform 130. In some implementations, the interface server 142 includes one or more network interfaces reachable from the network 110, e.g., via a gateway or firewall network device. In some implementations, the interface server 142 hosts a web server. In some implementations, the interface server 142 supports a custom instruction set, i.e., an application programming interface (API). In some implementations, the interface server 142 accepts data visualization requests from client devices 120, transmits responses to data visualization requests to client devices 120, and accepts annotation requests from client devices 120. In some implementations, client devices 120 must authenticate access permissions, e.g., by authenticating a credential or an account. In some such implementations, the interface server 142 manages authentication requests. FIG. 3, described in detail below, is a flowchart for a user experience 300 interacting with an interface provided by the interface server 142 to a client device 120.

The annotation manager 144 manages annotation requests received by the interface server 142 from client devices 120. In some implementations, the annotation manager 144 augments data visualizations generated by the output generator 148 with annotation data. In some implementations, the output generator 148 includes annotation data in output.

Figure 2:
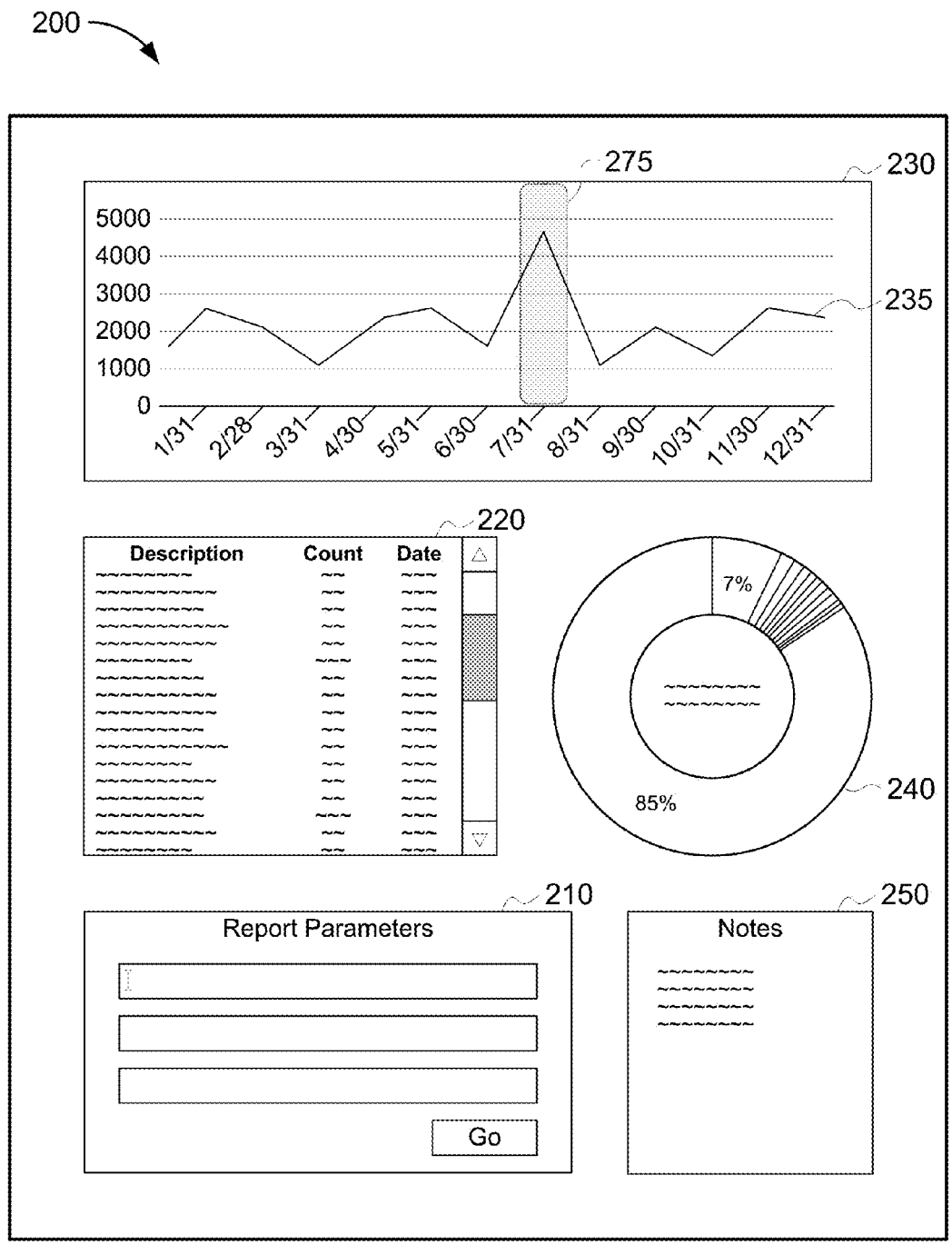
FIG. 2 is an illustration of an example graphical user interface.

The output generator 148 generates data visualizations. An example of a data visualization is shown in FIG. 2. Data visualizations may include charts, graphs, plot diagrams, box plot diagrams, line charts, bar charts, Pareto charts, pie charts, data models, multi-dimensional data models, custom infographics or infograms, and any other form data visualization. In some implementations, the output generator 148 generates data visualizations responsive to requests received by the interface server 142 from client devices 120. In some implementations, the output generator 148 generates data visualizations as an image, based on data retrieved from the data manager 150. The generated image may be in a standard image format such as GIF, JPEG, BMP, TIFF, or PNG. The generated image may be in a non-standard, i.e., a custom image format. In some implementations, the output generator 148 generates data visualizations as one or more data structures that can be rendered into an image by the client device 120.

In some implementations, the output generator 148 is in communication with the data manager 150, e.g., via a direct link or the network 110. In some implementations, the output generator 148 obtains data to represent in the generated data visualizations from the data manager 150. In some implementations, the output generator 148 obtains data from the data manager 150 using an API. In some implementations, the output generator 148 obtains data from the data manager 150 using an inter-process communication architecture such as the Common Object Request Broker Architecture (CORBA), Remote Procedure Calls (RPC), Object Linking and Embedding (OLE), Component Object Model (COM), or Distributed Component Object Model (DCOM). In some implementations, the output generator 148 obtains data from the data manager 150 using queries in a formal query language such as Structured Query Language (SQL), Hyper Text Structured Query Language (HTSQL), Contextual Query Language (CQL), Data Mining Extensions (DMX), or XML Query (XQuery). In some implementations, the output generator 148 obtains data from the data manager 150 using natural language or semantic queries. In some implementations, the output generator 148 obtains data from the data manager 150 using queries in a custom query language such as a Visualization API Query Language.

The data manager 150 provides data storage and management services persisting data in memory 156. The memory 156 may be implemented using one or more data storage devices. The data storage devices may be any memory device suitable for storing computer readable data. The data storage devices may include a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or BLU-RAY discs). Example implementations of suitable data storage devices include storage area networks (SAN), network attached storage (NAS), and redundant storage arrays.

The data manager 150 controls access to the memory 156. In some implementations, the data manager 150 hosts a query engine. In some implementations, the data manager 150 hosts a relational database, e.g., using a Relational Database Management System (RDBMS). In some implementations, the data manager 150 manages data in the memory 156 as files, e.g., XML files. In some implementations, the data visualization platform 130 regulates access to data or features using credentials or account management utilities. In some such implementations, credential or account information is stored by the data manager 150 in the memory 156.

The data visualization platform 130 allows client devices 120 to retrieve visualizations of data stored by the data manager 150. Annotations may be received by the data visualization platform 130 from a client device $120_a$, in reference to a data visualization of a first set of underlying data, and incorporated into a data visualization presented at client device $120_b$ that represents at least some of the same underlying data as the first set. FIG. 2, described in detail below, includes an example illustration of data visualizations that may be presented at the client device $120_a$. FIG. 3, described in detail below, is a flowchart for a user experience 300 interacting with such an interface at a client device 120.

FIG. 2 is an illustration of an example graphical user interface (GUI) 200. In some implementations, the interface server 142 provides data to a client device 120 for presentation, by the client device 120, as an interface, e.g., the GUI 200. The GUI 200 includes an input field 210 for report parameters, a detailed results list 220, data visualizations in the form of a line chart 230 and a pie chart 240, and notes 250. The line chart 230 represents data as a line 235 plotted against horizontal and vertical axes. A spike in the indicated region 275 in the line 235 is an example of an element in the data visualizations that warrants explanation via an annotation. In some implementations, the GUI 200 is a web page (or set of web pages) presented in a web browser executed at the client device 120. In some implementations, the GUI 200 is presented in a custom application executed at the client device 120.

Referring to FIG. 2 in more detail, the GUI 200 includes an input field 210 for report parameters. A user, presented with the GUI 200 by a client device 120, can enter information into the input field 210 to request or configure a report. The resulting report includes the data visualizations 230 and 240. For example, in some implementations, a user enters a search term and a date range into corresponding input fields 210. In some implementations, an input field 210 accepts a search query, e.g., a query using a natural language or a formal language such as SQL, HTSQL, CQuery, etc. In some implementations, an input field 210 is a menu of options, e.g., a drop down menu or a set a radio buttons. In some such implementations, the options are predetermined. In some implementations, at least some of the options are dynamically generated. For example, in some such implementations, some of the options are dynamically generated based on a previous search or report request.

The GUI 200 includes a detailed results list 220 and data visualizations in the form of a line chart 230 and a pie chart 240. These elements represent data responsive to a search query or report request, e.g., request submitted by the client device 120 and received by the interface server 142. The detailed results list 220 is a form of data visualization that presents result data in a text-based format. In some implementations, the detailed results list 220 presents raw data. In some implementations, the detailed results list 220 presents composite or aggregate data. The line chart 230 plots data points against horizontal and vertical axes and connects the points (or fits the points) with a line 235. The line chart 230 may, for example, illustrate trends over time. The pie chart 240 aggregates data together by shared qualities and provides an illustration, for example, of distribution between various qualities. For example, in some instances, the pie chart 240 might show derived metrics. The data shown in FIG. 2 is merely an example, and is not representative of any specific real data.

The line chart 230 includes a line 235 representing hypothetical data. A user interacting with the GUI 200 can select a portion of the line chart 230, e.g., the indicated region 275, and add an annotation, e.g., an explanation for the spike in the line 235. In some implementations, a user selects a portion of the data visualization by physically interacting with a presentation of the data visualization at the client device 120, e.g., by tapping on the visualization on a touchscreen, by bringing a mouse pointer over the visualization and clicking a mouse button, or otherwise. In some implementations, when a user taps, clicks on, or otherwise selects a portion of the line chart 230, a data entry field opens or pops up (not shown). The user can then populate the data entry field with annotation content. In some implementations, the data entry field for annotation content includes indicators describing the data to be annotated. In some such implementations, the user can modify the data indicators. In some implementations, when a user selects an element or portion of a data visualization such as the line chart 230 or pie chart 240, the selected data is also indicated in the detailed results list 220. For example, in some implementations, the lines of data represented in the selected portion of the chart are highlighted in the detailed results list 220. In some such implementations, a user can then refine the set of data to be annotated by interacting with the detailed results list 220, e.g., selecting or de-selecting rows of the detailed results list 220. In some implementations, the annotation is then displayed in a separate section of the GUI 200, e.g., in the notes field 250. In some implementations, the annotation is displayed in a pop-out bubble or window. In some implementations, display of the annotation in a pop-out is responsive to a user action, e.g., responsive to when a user hovers a mouse pointer over the annotated elements in the indicated region 275. As described in more detail herein, when data has been annotated in one presentation of the data, the annotations may then be included with future presentations of the annotated data.

Consider an example in which the data presented by the line chart 230 and pie chart 240 in the GUI 200 corresponds to data for events occurring on various dates over a calendar year, where the events are each attributable to some source or cause. For example, the events could be task completions by employees. The line chart 230 may represent the sum total of events in each calendar month, where most months see between 1,000 and 3,000 events and one month spikes shown in the indicated region 275 to over 4,000 events. The pie chart 240, showing metrics derived from the same data, may attribute the events to various employees or employee groups (e.g., departments). The pie chart 240 shown in FIG. 2 includes a large slice suggesting that approximately 85% of the events are attributable to one employee (or employee group). The detailed result list 220 might list each event. The underlying data records for these data visualizations might be a database table, or set of database tables, with records for each individual event. The presentation might be annotated such that the spike in the indicated region 275 is explained by the notes 250. For example, it may be that halfway through the year a department wrote off 2,000 tasks as unresolvable. The unresolvable tasks appear as though they were completed, resulting in the spike in the indicated region 275, but the alternative explanation that they were simply written off can be shown in by display of an annotation in notes 250. The annotation in this example is only relevant to data visualizations that include records corresponding to write off events. Accordingly, other data visualizations that include these records (e.g., a different calendar view that includes the month with the write off events) would also include the annotation, while other data visualizations that don't include these records (e.g., a different calendar view that doesn't include the month with the write off events) would not include the annotation. Even an alternative query, e.g., event completions for a particular employee or employee group, that pulled in some of the annotated records will benefit from the accompanying annotation data.

FIG. 3 is a flowchart for a user experience 300 interacting with an interface provided by the interface server 142 to a client device 120. In broad overview of the user experience 300, at stage 310, a user interacts with a client interface to generate a data visualization request. At stage 320, the client interface submits the data visualization request to a data visualization platform (e.g., the data visualization platform 130 illustrated in FIG. 1.) At stage 330, the client interface receives a response including the requested data visualization and, at stage 340, the client interface presents the data visualization included in the response. At stage 350, the user interacts with the client interface to select a portion of the data visualization and, at stage 360, the user supplies annotation content. At stage 370, the client interface submits the portion selection and the annotation content to the data visualization platform. The experience 300 may be repeated by the same user, or by another user. Each user interaction at stage 310, resulting in a data visualization presentation at stage 340, may result in presentation of annotated data, e.g., data annotated through a previous iteration of the user experience 300 at stages 360 and 370.

Referring to the user experience 300 illustrated in FIG. 3 in more detail, at stage 310, a user interacts with a client interface to generate a data visualization request. In some implementations, the client interface is a graphical user interface (GUI) presented to the user by a client device 120, e.g., the GUI 200 illustrated in FIG. 2. In some such implementations, the GUI 200 is a web page (or set of web pages) presented in a web browser executed at the client device 120. In some implementations, the GUI 200 is presented in a custom application executed at the client device 120. The GUI 200 facilitates interaction with the data visualization platform 130, e.g., via an interface server 142. In some implementations, the user interacts with the interface to specify the data visualization to be presented. The specification may be a function selection, a dataset selection, a menu selection, a query, or any other mode of specifying a desired data visualization. The interface on the client device 120 generates a request based on the user interaction. In some implementations, the generates a first request based on a user interaction and later generates a subsequent request without user interaction. For example, in some implementations, the interface may generate refresh requests after an amount of time has elapsed or responsive to an event unrelated to user interaction. In some implementations the client device generates the request as an Hypertext Transfer Protocol (HTTP) request. In some implementations, the generated request includes reference identifiers to one or more preexisting definitions stored by the data visualization platform 130. For example, a request for a well-established dataset definition may simply be of the form "get visualization X for dataset Y." In some implementations, the dataset may be identified by naming a function that the output generator 148 will use to obtain the requested data. In some implementations, the generated request includes parameters defining the dataset. For example, the request may include dataset parameters for ranges (e.g., date ranges), filters, data sources, etc. In some implementations, the generated request includes defines the dataset using a query. In some implementations, the generated request includes parameters defining the visualization format. For example, the request may include visualization parameters for the format (e.g., line chart, box plot, pie chart, etc.), scale, ranges, labels, etc.

At stage 320, the client interface submits the data visualization request to a data visualization platform (e.g., the data visualization platform 130 illustrated in FIG. 1.) In some implementations, the client device 120 submits the request to the interface server 142 via the network 110. In some implementations the client device submits the request as an Hypertext Transfer Protocol (HTTP) request. In some implementations, the client device 120 submits request data to the interface server 142 using asynchronous calls such as by AJAX.

At stage 330, the client interface receives a response including the requested data visualization. In some implementations, the client device 120 receives a response to the request from the interface server 142 via the network 110. As described in more detail below, in reference to FIG. 5, the data visualization platform 130 generates the data visualization, or generates data sufficient for the client device 120 to generate the data visualization, responsive to the request received at stage 320. The data visualization platform 130 provides this data to the client device 120. In some implementations, the data visualization platform 130 provides data visualization data to the client device 120 in a data stream. In some implementations, the data visualization platform 130 generates an image for the data visualization and transmits the generated image to the client device 120. The generated image may be in a standard image format such as GIF, JPEG, BMP, TIFF, or PNG. The generated image may be in a non-standard, i.e., a custom image format. In some implementations, the data visualization platform 130 provides data to the client device 120 for multiple data visualizations responsive to a single request.

At stage 340, the client interface presents the data visualization included in the response. The client interface, at the client device 120, renders or displays the data received from the data visualization platform 130 at stage 330. In some implementations, the client device 120 updates a document object model (DOM) with the received data. In some implementations, the client device 120 displays an image, or a set of images, on a screen or other display device.

At stage 350, the user interacts with the client interface to select a portion of the data visualization. In some implementations, the user taps, clicks on, or otherwise selects a portion of the data visualization as presented at the client device 120, e.g., selecting the region 275 within line chart 230. In some implementations, an interface server 142 receives an indication that the user has taped, clicked on, or otherwise selected a portion of the data visualization, e.g., selecting the indicated region 275 within line chart 230. In some such implementations, the interface server 142 responds to the received indication with additional information to confirm or narrower the user's selection. For example, in some implementations, the interface server 142 may cause the selected region to be highlighted or encircled in the data visualization, as displayed or presented at the client device 120. In some implementations, the client device 120 itself updates the presented interface, e.g., highlighting or circling the selected portion of the data visualization. In some implementations, the interface server updates a detailed results list 220 to reflect the results included in (or excluded from) the selected region. For example, in some implementations, the updated detailed results list 220 only includes results in the selected region. In some implementations, the updated detailed results list 220 includes all results represented by the data visualization, but the results included in the selected region are shown highlighted, with a different background color, with a thick border, in bold, or in some other differentiating manner.

At stage 360, the user supplies annotation content. In some implementations, when the interface detects a selection in stage 350, the interface causes a data entry field to open or pop up. In some implementations, the data entry field is opened responsive to a request to make a selection. In some implementations, the data entry field is always present in the interface. The user can then enter annotation content into the data entry field for submission to the interface server 142. The annotation content submitted by the user may be a text statement explaining some context or attribute of the annotated data. The annotation content submitted by the user may be a disclaimer. In some implementations, the annotation content submitted by the user include a hyperlink or network address. When the annotation content is presented with future data visualizations, a user can select the hyperlink to open an associated network document.

At stage 370, the client interface submits the portion selection and the annotation content to the data visualization platform. In some implementations, the client device 120 submits the portion selection and the annotation content to the interface server 142 via the network 110. In some implementations the client device submits the portion selection and the annotation content as an Hypertext Transfer Protocol (HTTP) request. In some implementations, the client device 120 submits the portion selection and the annotation content to the interface server 142 using asynchronous calls such as by AJAX. In some implementations, the client device 120 submits the annotation content to the interface server 142 separately from the portion selection. For example, in some implementations, the client device 120 submits the portion selection to the server, receives confirmation that the user can (e.g., is authorized to) annotate the selected portion, and responds to the confirmation with the annotation content.

A database, or more specifically a database management system (DBMS), organizes data in accordance with a database definition, e.g., a database schema. In a basic relational database, the DBMS maintains data in a table-like data structure. Each table has columns, each corresponding to an entry type, classification, or purpose. For example, a table might have a column for numerical data, a column for text data (e.g., a description of the numerical data), a column for date data, and so forth. In a relational database, each entry in a column in a table is also in a row associating the entry with entries from other columns in the table. In some instances, an entry will associate a row from one table with one or more rows in another table. In some DBMS implementations, virtual tables called "views" represent data pulled from one or more tables as though it, too, were a table (that is, the view looks to a database client or user as though it was a table, but is not necessarily stored as such). Other types of database management systems can also be used, including various types of relational databases, object oriented databases, document oriented databases, XML databases, NoSQL databases, and so forth. Many of these database types use tables, or table-like structures, in a manner similar to that described here. A client or user of a database can add data to, augment data in, or retrieve data from the database using database instructions, e.g., queries in a database query language such as the Structured Query Language (SQL). One or more database instructions may be grouped together into a database transaction. Traditionally, a database provides transaction atomicity, consistency, isolation, and durability. These properties are known by the acronym "ACID." In some implementations, the DBMS provides all of the ACID properties. However, in some implementations, the DBMS does not provide all of the ACID properties.

Figure 4:
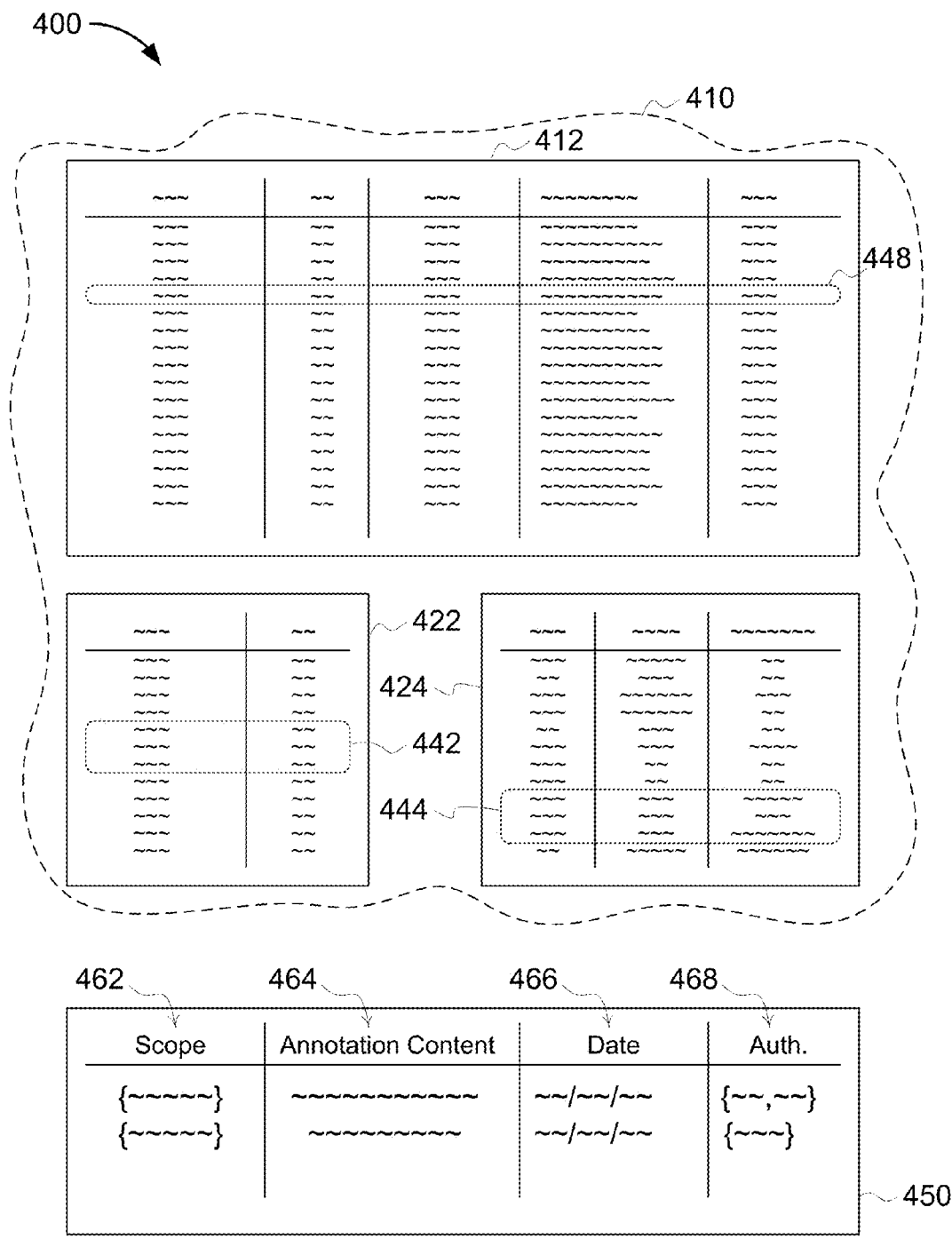
FIG. 4 is a diagram illustrating database tables for an example database.

FIG. 4 is a diagram illustrating database tables 400 for an example database. A database management system (DBMS) may handle multiple independent data collections, and each independent collection may have its own corresponding schema, controls, access policy, etc. In the illustrated example, a collection 410 of tables 412, 422, and 424, are shown. Some of the tables in the collection 410 may be data tables, e.g., tables 422 and 424, while table 412 may be a view, e.g., a view aggregating data from tables 422 and 424. For example, the data table 422 includes rows 442 and the data table 424 includes rows 444; the view table 412 may aggregate the data from row 442 and 444 of the data tables 422 and 424 into a row 448.

In some implementations, annotations received by a data visualization platform 130 are stored by the data manager 150 in an annotation table. Referring to FIG. 4, the illustrated database tables 400 include an example annotation table 450. The example annotation table 450 includes columns for scope definitions 462, annotation content 464, data information 466, and authorization data 468. When the data visualization platform 130 receives new annotation data, the annotation manager 144 (via the data manager 150) updates the annotation table, e.g., the example annotation table 450, with data for associating the annotation data with database tables to be annotated, e.g., tables 412, 422, and 442 from the collection 410.

In some implementations, the annotation manager 144 generates a data structure defining or describing data selected to be annotated. This data structure is a definition of the scope of the selected data, i.e., the data scope of the selected region of the data visualization. In some implementations, the scope definition includes a set of filters and a set of column identifiers that, together, circumscribe the set of internal data cells to be annotated. In some implementations, the scope definition includes a Structured Query Language (SQL) query. For example, in some implementations, one or more of the filters may be a SQL query (or a query in another structured database query language). In some implementations, the scope definition does not use queries, and instead uses specific internal identifiers of the database such that extraneous database entries cannot later be inadvertently added to the identified set of data. In some implementations, the filters are set so as to specifically identify the exact rows of database tables to be included. In some implementations, the scope definition includes a set of fixed row identifiers. For example, the scope included in an entry in the example annotation table 450 may indicate, in the scope column 462, specific rows 442 and 444 in data tables 422 and 424.

The annotation manager 144 then generates an associative record associating the received annotation content with the scope definition. In some implementations, the associative record is stored as an entry in an annotation table such as the example annotation table 450. In some implementations, the associative record may include information in addition to a scope definition (e.g., stored in the scope column 462) and annotation content (e.g., stored in annotation content column 464). For example, in some implementations, the associative record may include one or more relevant times or dates (e.g., stored in the date column 466). Relevant times or dates may include a creation time, entry time, validity time, or expiration time (or respective dates). In some implementations, annotations are only accepted from client devices authenticated to one or more specific users or user accounts. In some implementations, annotations are only presented back to client devices authenticated to one or more specific users or user accounts. In such implementations, the associative record may include authorization information (e.g., stored in the authorization column 468). In some implementations, the authorization information is structured as an access control list (ACL). In some implementations, the authorization information includes a cryptographic signature. In some implementations, the authorization information includes specification of users or user accounts authorized to modify the annotation. In some implementations, additional information is included in an associative record. The annotation record is recorded in the database by the data manager 150 associating the annotation content with the data elements specified by the scope definition. In some implementations, the annotation record is created iteratively, with components of the record written to the database at different times. For example, in some implementations, an annotation record is created in the database prior to receiving any specific annotation content. The record may then be subsequently updated as annotation content is received. In some implementations, a first user or user accounts may create an annotation and authorize other users or user accounts to modify or respond to the annotation. In some implementations, a user or user account may be specifically authorized to respond to an annotation on a particular table even if that user or user account is not authorized to create annotations on the particular table. That is, a first user or user account may invite a second user or user account to engage in a documented dialogue about specific data in the database. In some implementations, this is accomplished by allowing the first user to identify the second user in the ACL associated with the particular annotation.

In some implementations, the annotation manager 144 stores annotation association records in a location other than an independent table or other than the database. For example, in some implementations, additional annotation columns are added to data tables. In some implementations, the annotation manager 144 stores annotation records locally, e.g., in a separate database or a distinct file.

Once data in a data table has been annotated, the annotation manager 144 or the output generator 148 can include the annotation with subsequent presentations of the annotated data. For example, referring to FIG. 4, if the data in row 448 is identified by an annotation record in table 450, then any query returning the data in row 448 may also return the annotation content from that annotation record in table 450. In some implementations, the output generator 148 specifically queries the annotation table 450 for the annotation data. In some implementations, the data manager 150 is configured to return annotation content to the output generator 148 or annotation manager 144 when a query returns data that has been annotated. In some implementations, the data manager 150 is configured to notify the output generator 148 or annotation manager 144 when a query returns data that has been annotated, and the output generator 148 or annotation manager 144 can then respond to the notice by requesting the corresponding annotation content.

Figure 5:
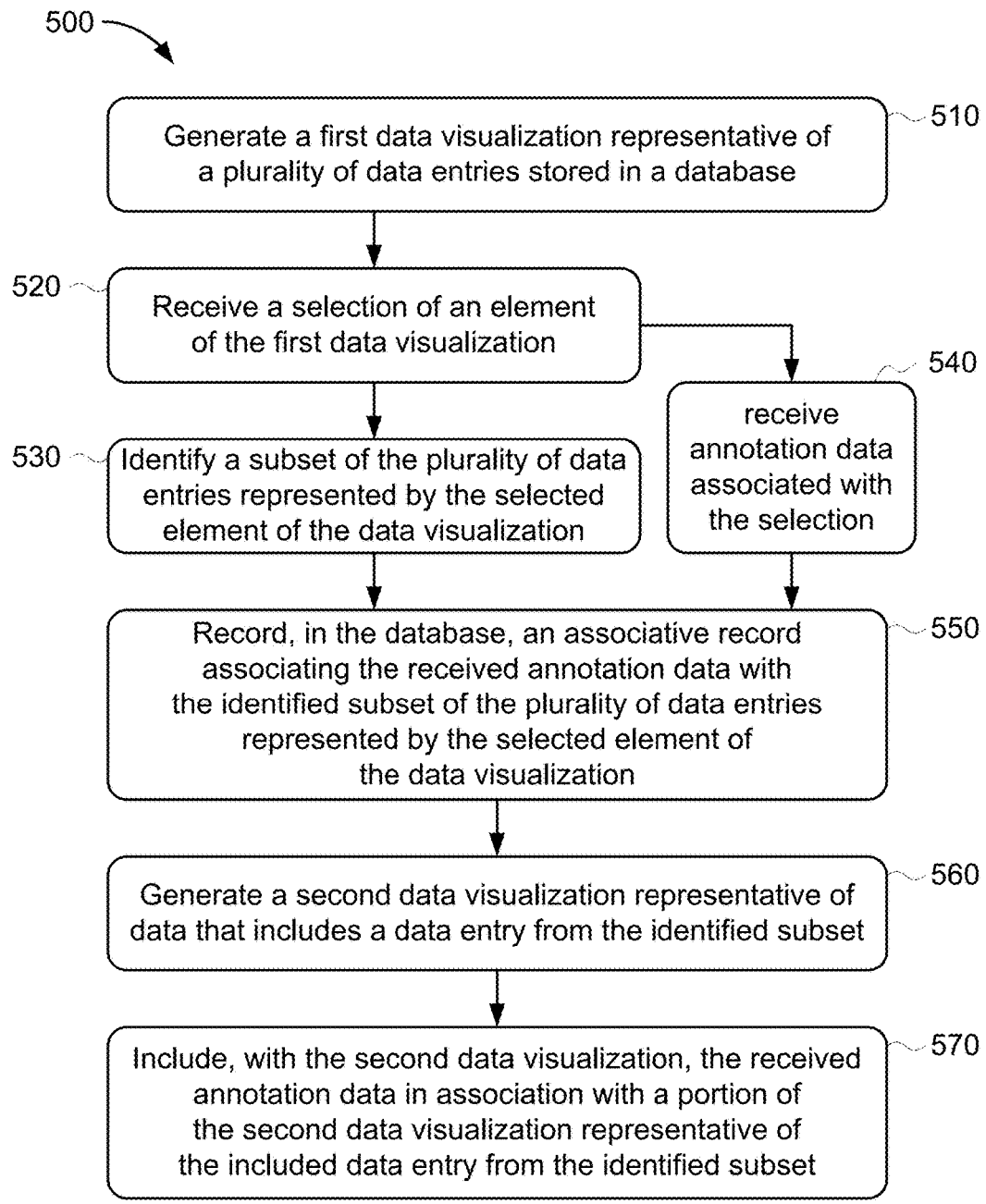
FIG. 5 is a flowchart for a method of annotating data represented in a data visualization.

FIG. 5 is a flowchart for a method 500 of annotating data represented in a data visualization. In broad overview of the method 500, at stage 510 a data processor 140 generates a first data visualization representative of a plurality of data entries stored in a database, e.g., a database managed by the data manager 150. At stage 520, the data processor 140 receives a selection of an element of the first data visualization and, at stage 530, identifies a subset of the plurality of data entries represented by the selected element of the data visualization. At stage 540, the data processor 140 receives annotation data associated with the selection. At stage 550, the data processor 140 records, in the database, an associative record associating the received annotation data with the identified subset of the plurality of data entries represented by the selected element of the data visualization. At stage 560, the data processor 140 generates a second data visualization representative of data that includes a data entry from the identified subset and, at stage 570, includes, with the second data visualization, the received annotation data in association with a portion of the second data visualization representative of the included data entry from the identified subset.

Referring to the method 500 illustrated in FIG. 5 in more detail, at stage 510 a data processor 140 generates a first data visualization representative of a plurality of data entries stored in a database, e.g., a database managed by the data manager 150. In some implementations, the data processor 140 generating the first data visualization is an output generator 148. In some implementations, the output generator 148 generates a data visualization responsive to a request received by the interface server 142 from a client device 120, e.g., client device 120$_a$. In some implementations, a user of the client device 120 interacts with an interface provided by the interface server 142 to request the data visualization. In some implementations, the request is selected from a menu. In some implementations, the request is provided to the user as an option, e.g., in a menu or as a previously submitted request. In some implementations, the output generator 148 generates data visualizations as an image, based on data retrieved from the data manager 150. In some implementations, the output generator 148 generates data visualizations as one or more data structures that can be rendered into an image by the client device 120. The first data visualization is representative of a plurality of data entries. That is, each element of the data visualization corresponds to one or more source entries stored or managed by the data manager 150. In some instances, there may be a one-to-one relationship between a value represented in the data visualization to an entry in a database. In some instances, there may be a one-to-many relationship between a value represented in the data visualization to entries in a database. In some implementations, the data visualization includes metadata descriptive of a source for the data.

At stage 520, the data processor 140 receives a selection of an element of the first data visualization. In some implementations, an interface server 142 receives the selection and passes the selection, or an indication of the selection, to the output generator 148. For example, in some implementations, the interface provided by the interface server 142 is a webpage and the client device 120 presents the webpage to a user; the user interacts with the webpage and causes the client device 120 to submit data representative of the interaction to the interface server 142, e.g., as an Hypertext Transfer Protocol (HTTP) request. In some implementations, the client device 120 submits data to the interface server 142 using asynchronous calls such as by AJAX.

At stage 530, the data processor 140 identifies a subset of the plurality of data entries represented by the selected element of the data visualization. The result data selected in stage 520 is derived by the output generator 148 from one or more data sources. In some implementations, there is a one-to-one correspondence between represented data-points and source data-points. In some implementations, there is a one-to-many or many-to-many correspondence between represented data-points and source data-points. For example, in some implementations, the data represented by the data visualization is aggregated data derived from multiple sources. A data processor 140, e.g., the annotation manager 144, identifies the source data represented by the selected region of the data visualization (as selected in stage 520). In some implementations, the source data is identified by parsing one or more queries used to obtain the represented data. In some implementations, the source data represented in the aggregate by the selected element of the data visualization is identified by identifying source data corresponding to, and aggregated into, the aggregated data. In some implementations, metadata is generated with the data visualization, the metadata describing or identifying corresponding source data for represented data elements. In some implementations, the data processor 140, e.g., the annotation manager 144, generates a data structure defining or describing the source data. This data structure is a definition of the scope of the selected data, i.e., the data scope of the selected region of the data visualization. In some implementations, the scope definition includes a set of filters and a set of column identifiers that, together, circumscribe the set of internal data cells represented by the selected region of the data visualization. In some implementations, the filters are set so as to specifically identify the exact rows of database tables relied upon in generating the data visualization.

At stage 540, the data processor 140 receives annotation data associated with the selection. As previously mentioned, the interface presented at the client device 120 allows a user to provide content with which to annotate the identified source data, e.g., the cells identified by the scope definition. At stage 540, the data processor 140 receives this content. For example, in some implementations, the interface provided by the interface server 142 is a webpage and the client device 120 presents the webpage to a user; the user enters annotation content into an input field and causes the client device 120 to submit the entered content to the interface server 142, e.g., as an Hypertext Transfer Protocol (HTTP) POST or PUT operation.

At stage 550, the data processor 140 records, in the database, an associative record associating the received annotation data with the identified subset of the plurality of data entries represented by the selected element of the data visualization. In some implementations, the annotation manager 144 creates an associative record to be stored by the data manager 150 in data storage 156. In some implementations, the associative record includes a data structure defining or describing the source data identified at stage 530. In some implementations, the associative record includes the scope definition generated at stage 530. In some implementations, the associative record includes the annotation data received at stage 540.

At stage 560, the data processor 140 generates a second data visualization representative of data that includes a data entry from the identified subset. In some implementations, the output generator 148 generates the second data visualization responsive to a new request (or a refresh request) received by the interface server 142 from the same client device 120, e.g., client device 120$_a$. In some implementations, the output generator 148 generates the second data visualization responsive to a new request received by the interface server 142 from another client device 120, e.g., client device 120$_b$. In some implementations, the output generator 148 generates the second data visualization responsive to the passage of time, e.g., refreshing a data visualization at periodic or set intervals. In some implementations, a user of the client device 120 interacts with an interface provided by the interface server 142 to request the second data visualization. In some implementations, the request causing generation of the second data visualization is a different query than the initial request; that is, the result datasets may have different schemas. However, the dataset represented by the second data visualization overlaps with the dataset represented by the first data visualization, such that at least some of the data represented by the data visualization generated in stage 510 is also represented by the second data visualization generated in stage 560. Of the data present in both datasets, some of that data is also associated with the annotation data received in stage 540.

At stage 570, the output generator 148 includes, with the second data visualization, the received annotation data in association with a portion of the second data visualization representative of the included data entry from the identified subset.

FIG. 6 is a block diagram of an example computing system 610. The example computing system 610 is suitable for use in implementing the computerized components described herein, in accordance with an illustrative implementation. In broad overview, the computing system 610 includes at least one processor 650 for performing actions in accordance with instructions and one or more memory devices 670 or 675 for storing instructions and data. The illustrated example computing system 610 includes one or more processors 650 in communication, via a bus 615, with memory 670, at least one network interface controller 620 with network interface 622 for connection to a network device 624 (e.g., for access to a network), and other components 680, e.g., input/output (I/O) components 630. Generally, the processor(s) 650 will execute instructions received from memory. The processor(s) 650 illustrated incorporate, or are directly connected to, cache memory 675. In some instances, instructions are read from memory 670 into cache memory 675 and executed by the processor(s) 650 from cache memory 675.

In more detail, the processor(s) 650 may be any logic circuitry that processes instructions, e.g., instructions fetched from the memory 670 or cache 675. In many embodiments, the processor(s) 650 are microprocessor units or special purpose processors. The computing system 610 may be based on any processor, or set of processors, capable of operating as described herein. The processor(s) 650 may be single core or multi-core processor(s). The processor(s) 650 may be multiple distinct processors. In some implementations, the processor(s) 650 are implemented as circuitry on one or more "chips."

The memory 670 may be any device suitable for storing computer readable data. The memory 670 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto-optical disks, and optical discs (e.g., CD ROM, DVD-ROM, or BLU-RAY discs). A computing system 610 may have any number of memory devices 670.

The cache memory 675 is generally a form of computer memory placed in close proximity to the processor(s) 650 for fast access times. In some implementations, the cache memory 675 is part of, or on the same chip as, the processor(s) 650. In some implementations, there are multiple levels of cache 675, e.g., L2 and L3 cache layers.

The network interface controller 620 manages data exchanges via the network interface 622 (sometimes referred to as a network interface port). The network interface controller 620 handles the physical and data link layers of the OSI model for network communication. In some implementations, some of the network interface controller's tasks are handled by one or more of the processor(s) 650. In some implementations, the network interface controller 620 is incorporated into the processor 650, e.g., as circuitry on the same chip. In some implementations, a computing system 610 has multiple network interfaces 622 controlled by a single controller 620. In some implementations, a computing system 610 has multiple network interface controllers 620. In some implementations, each network interface 622 is a connection point for a physical network link (e.g., a cat-5 Ethernet link). In some implementations, the network interface controller 620 supports wireless network connections and an interface 622 is a wireless (e.g., radio) receiver/transmitter (e.g., for any of the IEEE 802.11 protocols, near field communication "NFC", BLUETOOTH, BLE, ZIGBEE, ANT, or any other wireless protocol). In some implementations, the network interface controller 620 implements one or more network protocols such as Ethernet. Generally, a computing system 610 exchanges data with other computing devices via physical or wireless links through a network interface 622. The network interface 622 may link directly to another device or to another device via an intermediary device, e.g., a network device such as a hub, a bridge, a switch, or a router, connecting the computing system 610 to a data network such as the Internet.

The computing system 610 may include, or provide interfaces for, one or more input or output (I/O) components 630. Input devices include, without limitation, keyboards, microphones, touch screens, foot pedals, sensors, MIDI devices, and pointing devices such as a mouse or trackball. Output devices include, without limitation, video displays, speakers, refreshable Braille terminal, lights, MIDI devices, and 2-D or 3-D printers.

The other components 680 may include an I/O interface, external serial device ports, and any additional co-processors. For example, a computing system 610 may include an interface (e.g., a universal serial bus (USB) interface) for connecting input devices, output devices, or additional memory devices (e.g., portable flash drive or external media drive). In some implementations, a computing system 610 includes an additional device 680 such as a co-processor. For example, a math co-processor can assist the processor 650 with high precision or complex calculations.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium is tangible. The computer storage medium stores data, e.g., computer-executable instructions, in a non-transitory form.

A computer program (also known as a program, software, software application, script, or code) can be written in any form of programming language, including compiled languages, interpreted languages, declarative languages, and procedural languages, and the computer program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, libraries, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a field programmable gate array (FPGA) or an application specific integrated circuit (ASIC). Such a special purpose circuit may be referred to as a computer processor even if it is not a general-purpose processor.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," an so forth are not necessarily meant to indicate an ordering and are generally used merely to distinguish between like or similar items or elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be used.

What is claimed is:

1. A method comprising:
   generating a first data visualization representative of a plurality of data values, wherein the plurality of data values are a function of values of a plurality of source data entries stored in a database;
   receiving, from a first user, a selection of an element of the first data visualization associated with one or more of the plurality of data values;
   identifying a subset of the plurality of source data entries based on the selection, wherein the one or more of the plurality of data values are a function of the subset of the plurality of source data entries;

receiving, from the first user, annotation data associated with the selection and one or more privileges associated with the annotation data;

recording, in the database, an associative record associating the received annotation data with the identified subset of the plurality of source data entries and the one or more privileges;

receiving, from a second user, a request to generate a second data visualization representative of data that includes a data value, wherein the data value is a function of at least one source data entry from the identified subset of the plurality of source data entries;

determining, based on the one or more privileges, whether the second user is authorized to view the annotation data;

generating the second data visualization in response to the request;

causing a user device to display the second data visualization with the received annotation data in association with a portion of the second data visualization representative of the data value in response to a first determination that the second user is authorized to view the annotation data; and causing the user device to display the second data visualization without the annotation data in response to a second determination that the second user is not authorized to view the annotation data.

2. The method of claim 1, further comprising storing, in the database, a scope definition for the association between the received annotation data and the identified subset of the plurality of source data entries.

3. The method of claim 2, wherein the scope definition includes a data structure comprising a set of filters and a set of column identifiers.

4. The method of claim 2, wherein the scope definition includes a Structured Query Language (SQL) query.

5. The method of claim 2, wherein the scope definition includes a set of fixed row identifiers.

6. The method of claim 1, wherein the one or more privileges include an Access Control List (ACL).

7. The method of claim 1, wherein the plurality of data values are aggregated data values, wherein the method further comprises:

generating the first data visualization based on the aggregated data values, wherein the aggregated data values are derived from the plurality of source data entries stored in the database; and identifying the subset of the plurality of source data entries by identifying one or more of the plurality of source data entries corresponding to, and aggregated into, one or more of the aggregated data values represented by the selected element of the first data visualization.

8. The method of claim 7, wherein the first data visualization includes metadata describing the plurality of source data entries.

9. The method of claim 1, wherein the one or more privileges further identify one or more users authorized to respond to the annotation data;

wherein the method further comprises:
determining whether the second user is authorized to respond to the annotation data based on the one or more privileges;
receiving second annotation data from the second user, wherein the second annotation data is a response to the annotation data; and recording, in the database, the second annotation data in response to a third determination that the second user is authorized to respond to the annotation data.

10. The method of claim 9, wherein the annotation data comprises an invitation inviting the second user to respond to the annotation data, wherein the invitation identifies the second user.

11. A system comprising:
a data storage system storing a plurality of source data entries in a database;
a network interface;
a processor configured to execute instructions stored in a memory; and
the memory storing instructions that, when executed by the processor, cause the processor to:
generate a first data visualization representative of a plurality of data values, wherein the plurality of data values are a function of values of the plurality of source data entries stored in the database;
receive, via the network interface from a first user, a selection of an element of the first data visualization associated with one or more of the plurality of data values;
identify a subset of the plurality of source data entries based on the selection, wherein the one or more of the plurality of data values are a function of the subset of the plurality of source data entries;
receive, via the network interface from the first user, annotation data associated with the selection and one or more privileges associated with the annotation data;
record, in the database, an associative record associating the received annotation data with the identified subset of the plurality of source data entries and the one or more privileges;
receive, via the network interface from a second user, a request to generate a second data visualization representative of data that includes a data value, wherein the data value is a function of at least one source data entry from the identified subset of the plurality of source data entries;
determine, based on the one or more privileges, whether the second user is authorized to view the annotation data;
generate the second data visualization in response to the request;
cause a user device to display the second data visualization with the received annotation data in association with a portion of the second data visualization representative of the data value in response to a first determination that the second user is authorized to view the annotation data; and
cause the user device to display the second data visualization without the annotation data in response to a second determination that the second user is not authorized to view the annotation data.

12. The system of claim 11, wherein the database stores a scope definition for the association between the received annotation data and the identified subset of the plurality of source data entries.

13. The system of claim 12, wherein the scope definition includes a data structure comprising a set of filters and a set of column identifiers.

14. The system of claim 12, wherein the scope definition includes a Structured Query Language (SQL) query.

15. The system of claim 12, wherein the scope definition includes a set of fixed row identifiers.

16. The system of claim 11, wherein the one or more privileges include an Access Control List (ACL).

17. The system of claim 11, wherein the plurality of data values are aggregated data values, wherein the memory further storing instructions that, when executed by the processor, cause the processor to:
generate the first data visualization based on the aggregated data values, wherein the aggregated data values are derived from the plurality of source data entries stored in the database; and
identify the subset of the plurality of source data entries by identifying one or more of the plurality of source data entries corresponding to, and aggregated into, one or more of the aggregated data values represented by the selected element of the first data visualization.

18. The system of claim 17, wherein the first data visualization includes metadata describing the plurality of source data entries.

19. A non-transitory computer-readable medium storing instructions that, when executed by a processor, cause the processor to:
generate a first data visualization representative of a plurality of data values, wherein the plurality of data values are a function of values of a plurality of source data entries stored in a database;
receive, via a network interface from a first user, a selection of an element of the first data visualization associated with one or more of the plurality of data values;
identify a subset of the plurality of source data entries based on the selection, wherein the one or more of the plurality of data values are a function of the subset of the plurality of source data entries;
receive, via the network interface from the first user, annotation data associated with the selection and one or more privileges associated with the annotation data;
record, in the database, an associative record associating the received annotation data with the identified subset of the plurality of source data entries and the one or more privileges; and
receiving, via the network interface from a second user, a request to generate a second data visualization representative of data that includes a data value, wherein the data value is a function of at least one source data entry from the identified subset of the plurality of source data entries;
determine, based on the one or more privileges, whether the second user is authorized to view the annotation data;
generate the second data visualization in response to the request;
cause a user device to display the second data visualization with the received annotation data in association with a portion of the second data visualization representative of the data value in response to a first determination that the second user is authorized to view the annotation data; and
cause the user device to display the second data visualization without the annotation data in response to a second determination that the second user is not authorized to view the annotation data.

20. The non-transitory computer-readable medium of claim 19, wherein the database stores a scope definition for the association between the received annotation data and the identified subset of the plurality of source data entries.

* * * * *